US009106358B2

(12) United States Patent
Woo

(10) Patent No.: US 9,106,358 B2

(45) Date of Patent: Aug. 11, 2015

(54) MULTI-CELL INTERFERENCE MANAGEMENT

(71) Applicant: AirHop Communications, Inc., San Diego, CA (US)

(72) Inventor: Hsien Woo, San Diego, CA (US)

(73) Assignee: AirHop Communications, Inc., San Diego, CA (US)

(*) Notice: Subject to any disclaimer, the term of this patent is extended or adjusted under 35 U.S.C. 154(b) by 0 days.

(21) Appl. No.: 14/109,747

(22) Filed: Dec. 17, 2013

(65) Prior Publication Data

US 2014/0169200 A1 Jun. 19, 2014

Related U.S. Application Data

(60) Provisional application No. 61/738,713, filed on Dec. 18, 2012.

(51) Int. Cl.

| | |
|---|---|
| ***H04J 11/00*** | (2006.01) |
| ***H04W 28/02*** | (2009.01) |
| ***H04W 72/08*** | (2009.01) |
| ***H04W 84/18*** | (2009.01) |

(52) U.S. Cl.

CPC ......... *H04J 11/0056* (2013.01); *H04J 11/0053* (2013.01); *H04W 28/0236* (2013.01); *H04W 72/082* (2013.01); *H04W 72/085* (2013.01); *H04W 84/18* (2013.01)

(58) Field of Classification Search

None

See application file for complete search history.

(56) References Cited

U.S. PATENT DOCUMENTS

| | | | | |
|---|---|---|---|---|
| 2008/0233967 | A1* | 9/2008 | Montojo et al. | 455/452.2 |
| 2009/0196245 | A1* | 8/2009 | Ji | 370/329 |
| 2009/0303900 | A1* | 12/2009 | Cho et al. | 370/252 |
| 2010/0093363 | A1 | 4/2010 | Malladi | |
| 2010/0322176 | A1* | 12/2010 | Chen et al. | 370/329 |
| 2010/0323711 | A1 | 12/2010 | Damnjanovic et al. | |
| 2011/0183679 | A1* | 7/2011 | Moon et al. | 455/450 |
| 2012/0082052 | A1 | 4/2012 | Oteri et al. | |
| 2013/0114434 | A1* | 5/2013 | Muruganathan et al. | 370/252 |
| 2014/0094181 | A1* | 4/2014 | Kakinada et al. | 455/446 |
| 2014/0198744 | A1* | 7/2014 | Wang et al. | 370/329 |

FOREIGN PATENT DOCUMENTS

| | | |
|---|---|---|
| WO | 2012123310 | 9/2012 |

OTHER PUBLICATIONS

Stolyar et al., Self-Organizing Dynamic Fractional Frequency Reuse for Best-Effort Traffic Through Distributed Inter-Cell Coordination, INFOCOM 2009, IEEE, Issue Date Apr. 19-25, 2009.

* cited by examiner

*Primary Examiner* — Huy D Vu

*Assistant Examiner* — Justin T Van Roie

(74) *Attorney, Agent, or Firm* — Van Pelt, Yi & James LLP

(57) ABSTRACT

Multi-cell interference management (MCIM) for interference management among multiple cells in a wireless communication network is provided. In some embodiments, MCIM includes collecting data (e.g., CQI measurements and/or subband usage statistics) from a neighborhood of base stations; determining local and neighborhood system utility metrics; and determining interference managing directives (e.g., that can be communicated to the MAC layer of a base station in the neighborhood of base stations).

19 Claims, 6 Drawing Sheets

MULTI-CELL INTERFERENCE MANAGEMENT

CROSS REFERENCE TO OTHER APPLICATIONS

This application claims priority to U.S. Provisional Patent Application No. 61/738,713 entitled MULTI-CELL INTERFERENCE MANAGEMENT filed Dec. 18, 2012, which is incorporated herein by reference for all purposes.

BACKGROUND OF THE INVENTION

Orthogonal Frequency Division Multiplexing (OFDM) is an advanced communication technology that makes use of orthogonal subcarriers to simultaneously carry user's (or users') data. OFDM is widely adopted as the underlying technology for most currently advanced wireless communication systems, such as Long Term Evolution (LTE) and WiMAX.

BRIEF DESCRIPTION OF THE DRAWINGS

Various embodiments of the invention are disclosed in the following detailed description and the accompanying drawings.

DETAILED DESCRIPTION

Figure 1:
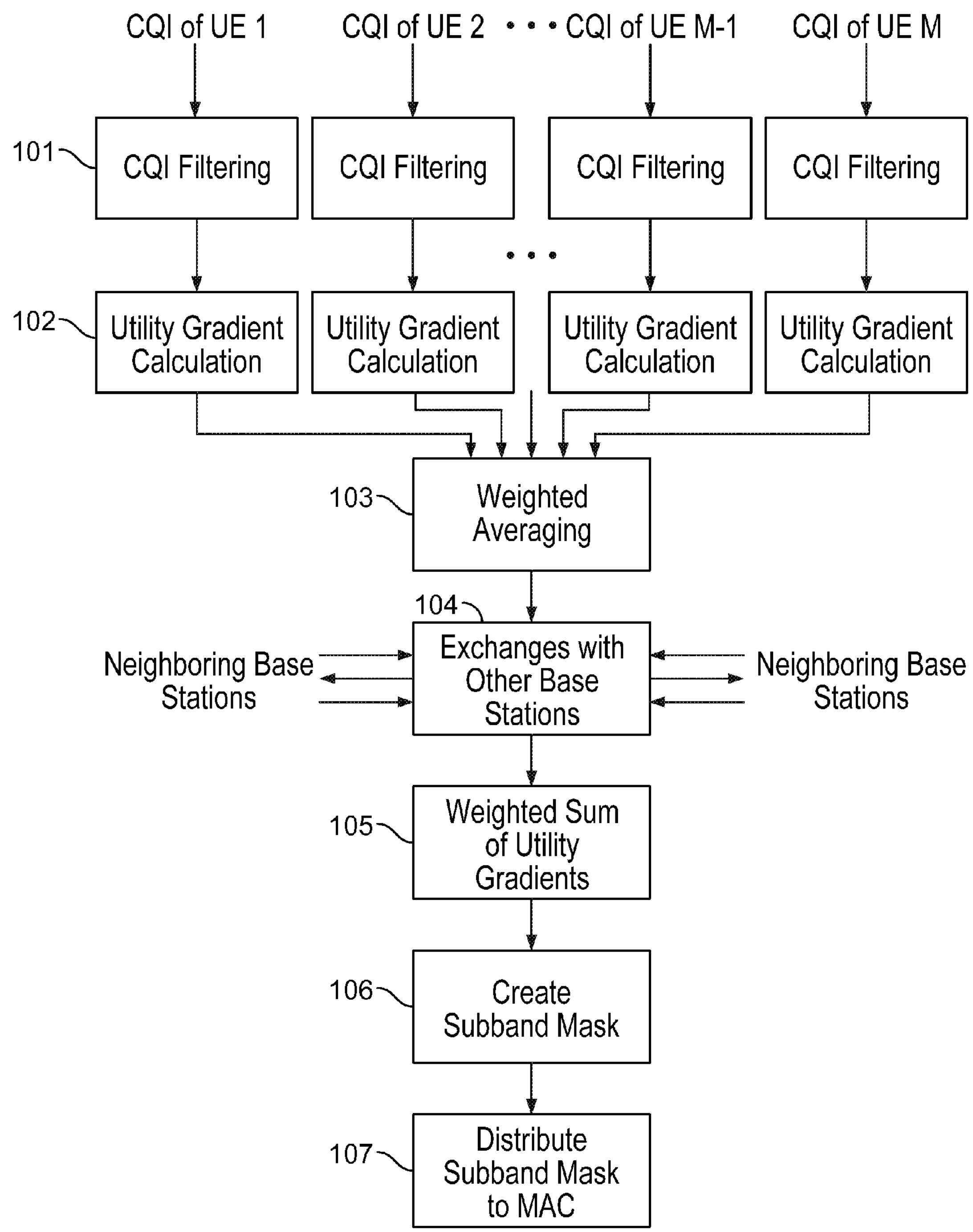
FIG. 1 illustrates a flow diagram for a subband CQI-based Multi-Cell Interference Management (MCIM) process in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In Orthogonal Frequency Division Multiplexing (OFDM) systems, radio resources are typically sub-divided into blocks in both frequency and time domain for assignment to transmit data for a particular traffic flow of a particular user. Those resource blocks in the frequency domains can be grouped and classified as a subband of resources. A whole band of frequency resources refers to all the resources under the system bandwidth. A subband of frequency resources indicates a portion of the system bandwidth (e.g., for subdividing of the resources under the system bandwidth).

A wireless communication network generally includes a network of base stations. Each base station has its own area of coverage, often referred to as a cell, which is intended to be the area in which it provides service to users (e.g., users using User Equipment (UE), such as mobile devices) of that wireless communication network. Together, this network of base stations can be used to provide service to all users under the whole area served by that wireless communication network. The equipment used by a user to access the network can be generally referred to as User Equipment (UE). Together the UE and the base station form a peer-pair connected by the wireless communication link through which service/data and control information is exchanged.

Generally, a wireless communication network (e.g., also referred to as a wireless network) includes base stations with similar characteristics, such as maximum transmit power, antenna configuration, footprints, service capacity, and/or other characteristics. This kind of network is generally referred to as a homogeneous network, and a homogeneous network usually includes macro cell base stations, that is, base stations that are capable of supporting a coverage area in the order of tenths to tens of kilometers. However, more recently, different categories of base stations have been introduced. The categories can include femto cells, pico cells, and microcells, or more generally, referred to as small cells. Each of these new types of base stations is designed to provide service coverage to a house, a building floor, an area of hundredths of kilometers, and/or other areas of service coverage. The inclusion of base stations with drastically different capabilities into one single network creates the new classification of a heterogeneous network. The reasons for inclusion of those new base station types are generally to improve coverage and/or network capacity while still managing total cost.

Because of the nature of radio-wave propagation and both the radio-frequency environment and the network load situation being dynamic, the coverage area of a base station in a wireless network is generally changing. Hence, in a wireless network with all base stations free to use the whole system bandwidth (e.g., a frequency reuse of one), because of spillover of power outside of a base station's intended coverage area, significant interference can occur and thus, communication link performance can be degraded. This phenomenon can be particularly severe in boundary regions between coverage areas of two or more base stations.

With heterogeneous wireless networks (e.g., heterogeneous cellular and Wi-Fi networks), this interference problem can be further complicated by the presence of not just more base stations but also the different types of base stations. In some cases, the small-cell base stations are located within a coverage area of macro cells and, in some cases, the deployment of such base stations (e.g., especially femto cells, as a user can buy a femto cell and deploy that femto cell in the user's home) is less well-planned. As a result, severe interference degradation areas can happen more often and in more areas in a heterogeneous network. Thus, new and improved interference management algorithms are needed for such cellular network environments (e.g., homogeneous networks and heterogeneous networks).

Accordingly, to mitigate such problems associated with heterogeneous networks, different interference management schemes are provided as disclosed herein. For example, these interference management schemes can enhance system capacity and/or can improve the performance of the groups of users that are most susceptible to interference degradation.

In some embodiments, an interference management scheme (e.g., also referred to herein as Multi-Cell Interference Management (MCIM)) is provided that is applicable to wireless systems supporting OFDM type technologies (e.g., LTE and WiMAX) in either a homogeneous network (e.g., all macro cells) deployment environment or a heterogeneous network (e.g., macro cells and pico cells) deployment environment. For example, the interference management scheme can be used to implement Self-Organizing Network (SON) management operations that can be performed in various network architectures for a wireless network deployment, which can be implemented using a centralized or a distributed mode of operation as further described herein.

In a wireless communication system, there generally are mechanisms for the UE to provide feedback to the base stations regarding the quality of the wireless communication links as observed by the UE. In the LTE system, these feedback mechanisms are generally referred to as Channel Quality Indicators (CQIs). The CQI is an encoded index that reflects the quality of the communication link between the base station and the mobile unit (e.g., UE) as measured by the ratio between the signal power and the sum power of interference and noise (SINR). The CQI values are typically reported to the base station in relatively short time intervals (e.g., in the order of a few subframes) to reflect more real-time link quality.

For example, the CQI measurements can further be categorized into different types. Typically, a CQI measurement that reflects the link quality averaged over the whole transmission bandwidth, the wideband CQI, will at least be provided. In addition, a CQI measurement that reflects the link quality of a particular portion of the bandwidth can also be used. Those measurements are referred to herein as subband CQIs. In some implementations, both wideband and subband CQI measurements can be used by an MCIM implementation as further described herein.

In a wireless communication system, there generally are mechanisms for the mobile units to feed back to the base stations the radio signal strength of the base station as observed by the mobile units. Typically, these signal strength measurements will include measurements of both the mobile unit's serving base station and neighboring base stations. In the LTE system, these measurements are generally referred to as Reference Signal Received Power (RSRP) (e.g., LTE terminology is generally used herein, and those skilled in the art will understand the corresponding terminology used in other cellular communication standards, such as WiMAX or other cellular communication standards). The RSRP values are typically reported to the base station in relatively longer time intervals (e.g., in the order of a few seconds) to reflect longer-term link quality variations.

Figure 6:
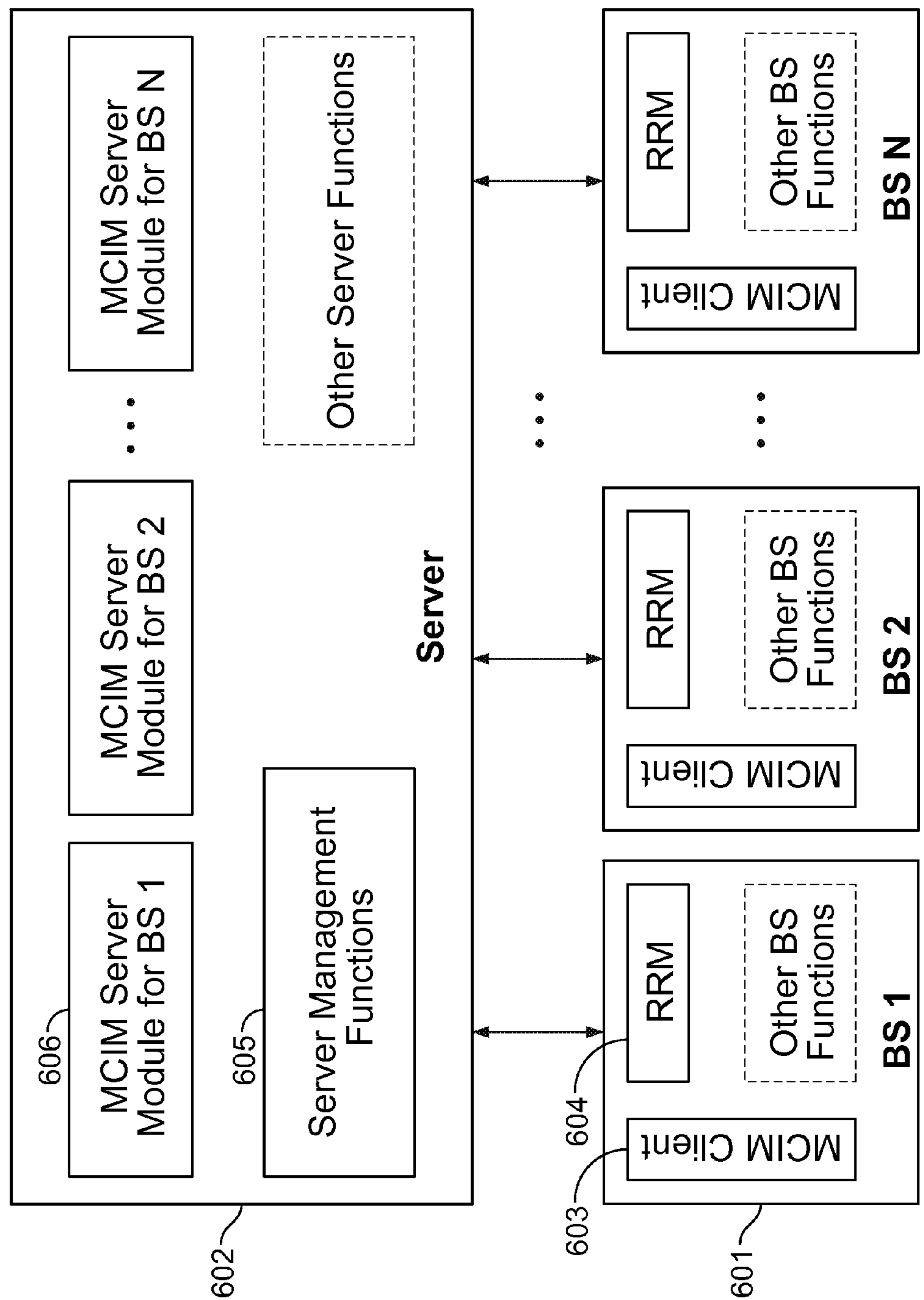
FIG. 6 illustrates a functional diagram of an architecture for implementing an MCIM approach in accordance with some embodiments.

In a wireless communication system, the base stations may not have the same transmission power, although practically, that is not usually the case in a macro cell only deployment. In a heterogeneous network, because of the presence of different categories of base stations, the transmission power from each type of base station can generally be different. In a typical configuration, a base station will be able to obtain the transmission power of other base stations through, for example, a database maintained in the Element Management Systems (EMS) (e.g., the EMS can receive and maintain this information from, for example, server 602 as shown in FIG. 6, in which server 602 is in communication with each of the base stations, and in which the functionality shown with respect to server 602 can be executed on an EMS server or another server/computing appliance that is in communication with the EMS server, or in some implementations, some or all of the MCIM functionality shown with respect to server 602 can be distributed to the base stations, as further described herein).

FIG. 1 illustrates a flow diagram for a subband CQI-based Multi-Cell Interference Management (MCIM) process in accordance with some embodiments. As shown, FIG. 1 illustrates a method to process user CQI reports and convert the user CQI reports to Multi-Cell Interference Management (MCIM) relevant metrics that can then be used to create subband scheduling directives to a MAC scheduler as described herein.

Referring to FIG. 1, at 101, the MCIM approach includes various pre-processing techniques (e.g., filtering, dropping/sub-sampling, smoothing, converting to SINR metrics, and/or other pre-processing operations) of the CQI values as reported by the mobile units. If the reported CQI values are in the form of encoded indices (e.g., as it is in the case of LTE, for example), then the reported CQI values can first be converted into some meaningful physical metrics, such as SINR values, as would be apparent to one of ordinary skill in the art in view of the various embodiments described herein. After the conversion, filtering can be applied to such physical metrics. The parameters for such a filter can be tailored to achieve the desired performance. For example, such a filter can generally include various techniques for providing an averaging of the values over a time period. In some embodiments, a first-order Infinite Impulse Response (IIR) filter with a desired time constant is used to implement such a filter.

With the wireless radio resources being limited and that often at any given point in time, many users will need to be served at the same time, a base station generally needs a management functionality to control the use of radio resources so as to satisfy the needs of each of the users as much as possible while not overloading and crashing the system. In general, that functionality is called Radio Resource Management (RRM), and RRM typically includes operations like user/service scheduling, admission control, congestion control, and/or various other operations. Various techniques have been developed to facilitate such RRM operations. For user/service scheduling, one such commonly used technique is based on the optimization of a pre-defined system utility function. For example, a utility function leads to the creation of priority to be assigned to each user/service and at each scheduling instant; the base station can choose to serve which users/services based on their assigned priorities.

Some well-known scheduling techniques exist, such as maximum throughput, round robin, proportional fair, and equal grade-of-service, which can only be viewed as specific realizations under the general concept of utility function-based scheduling techniques.

In general, the system utility function has either throughput or delay (e.g., or sometimes both) as an input. Also, in general, the throughput and delay performance experienced by a user is in turn a function of its SINR. In some embodiments, an MCIM approach utilizes this relationship between the utility function and the SINR of the user. More specifically, for a given utility function, an equation can be formulated that relates the change in utility against the change in SINR through, for example, a differentiation operation, as would be apparent to one of ordinary skill in the art in view of the various embodiments disclosed herein. An example utility function is a logarithmic function with respect to throughput and in turn, throughput can be related to SINR via Shannon's capacity equation, such as the example utility function shown below (e.g., which attempts to maximize throughput).

$$\text{Utility} = \log(\text{Throughput}) \text{ and Throughput} = \text{Bandwidth} \times \log_2(1 + SINR)$$

$$\frac{\partial \text{Utility}}{\partial SINR} = \frac{\partial \text{Utility}}{\partial \text{Throughput}} \times \frac{\partial \text{Throughput}}{\partial SINR} = \frac{1}{\log_2(1+SINR)} \times \frac{1}{\ln(2)} \times \frac{1}{1+SINR}$$

The SINR as measured by the UE is a function of the transmit power from base stations. In particular, a relationship can be derived between the changes in SINR as relative to a change in transmit power from either the serving base station (i.e., the change in desired signal power) or any other base station (i.e., the change in interference power) through, again for example, a differentiation operation, as would be apparent to one of ordinary skill in the art in view of the various embodiments disclosed herein. For example, in these calculations, the various parameters described above (e.g., CQI, SINR, and RSRP) can be utilized. For SINR changes relative to power change in the serving base station, an example function is shown below.

$$\frac{\partial SINR}{\partial Power_{servingBS}} = \frac{SINR}{Power_{servingBS}}$$

For SINR changes relative to power change in a neighbor base station, an example function is shown below.

$$\frac{\partial SINR}{\partial Power_{neighborBS}} = -(SINR)^2 \times \frac{1}{Power_{servingBS}} \times \frac{RSRP_{neighborBS} / Power_{neighborBS}}{RSRP_{servingBS} / Power_{servingBS}}$$

Through combining these operations discussed above (e.g., as described in the previous two paragraphs, at 102 (utility gradient calculation), a relationship is determined between the changes in utility against the changes in transmit power of base stations, as shown in FIG. 1. This relationship is generally referred to as the utility gradient relative to power changes (e.g., changes in utility per unit change in transmit power per subband). For utility changes relative to power change in the serving base station, an example function is shown below.

$$\frac{\partial \text{Utility}}{\partial Power_{neighborBS}} = \frac{1}{\log_2(1+SINR)} \times \frac{1}{\ln(2)} \times \frac{1}{1+SINR} \times \frac{SINR}{Power_{servingBS}}$$

For utility changes relative to power change in a neighbor base station, an example function is shown below.

$$\frac{\partial \text{Utility}}{\partial Power_{neighborBS}} = \frac{1}{\log_2(1+SINR)} \times \frac{1}{\ln(2)} \times \frac{1}{1+SINR} \times (-(SINR)^2) \times \frac{1}{Power_{servingBS}} \times \frac{RSRP_{neighborBS} / Power_{neighborBS}}{RSRP_{servingBS} / Power_{servingBS}}$$

In some embodiments, the utility gradient is calculated per user (e.g., as SINR can be reported by each user), as shown in FIG. 1. Hence, a technique is needed to create a sector-wise utility gradient from those individual user-based gradients. As indicated at 103, a sector-wise utility gradient from those individual user-based gradients is provided using a weighted averaging method. In particular, the weights for averaging are generally tied to the type of scheduler used. Typically, the weights reflect the characteristics of the scheduler. For example, for a round robin type scheduler, each user can be allocated equal weight. For other type of schedulers, weights can be derived from analytical or empirical studies of the scheduler. As will now be apparent to those of ordinary skill in the art, various other types of schedulers (e.g., other scheduling functions and weighting) can be applied using the various techniques described herein.

As discussed above, the SINR measured by a user is sensitive to transmit power from both its serving base stations and other neighboring base stations. As a result, the utility gradients generally have different values with regard to the changes in serving base station's power and to the changes in the transmit power of each neighboring base station. Thus, in some implementations, a base station can estimate, through the MCIM approach described herein, how its utility is going to vary per changes in either its own power or its neighboring base stations' power.

As also discussed above, in some implementations, if subband CQI is available, then utility gradient with regard to power changes per subband can be obtained at a base station using the various techniques described above.

At 104, the utility gradient information is exchanged among base stations. As discussed in the previous two paragraphs, each base station can calculate its estimates of how its utility is going to be affected by its neighboring base stations' change in subband power. In some embodiments, these per subband, per neighbor base station utility gradients are distributed to each base station's neighbors. For example, each base station can send its subband utility gradients with regard to a certain neighboring base station's power change to that particular neighbor. This exchange can be facilitated by direct (e.g., logical or physical) connections (e.g., using an X-2 interface in LTE, which facilitates a distributed architecture implementation) or by indirect distribution through servers (e.g., such as server 602 as shown in FIG. 6, which facilitates a centralized architecture of an MCIM implementation, as further discussed below).

In addition to distributing out utility gradients, a base station also receives utility gradients (e.g., utility gradient information, such as calculated using techniques described above) from its neighbors by that same mechanism as described in the previous paragraph performed by its neighbors. Note that the utility gradients a base station receives reflect how its power change will affect its neighbor's (per subband) utility as estimated at the neighbors.

After the information exchanges among neighboring base stations, each base station then will have obtained utility gradients from its own calculation and also from its neighbors. As shown at 105, for each subband, the base station adds up these utility gradients to estimate how the total utility around its network neighborhood is going to change with regard to its power change for that subband. When performing the summation, weights can also be added, for example, to emphasize or de-emphasize the relative importance between its own utility change and neighbors' utility changes.

At 106, processing of the summed utility gradients is performed to create a subband mask. Various techniques can be used to process the summed utility gradients. For example, a simpler but less optimal solution is to use them to drive an on-off type subband scheduling decision. That is, based on the processing of the utility gradient, a base station will determine whether to schedule a user on a particular subband or not. Accordingly, the MCIM approach can be implemented to provide a subband mask to direct the scheduler on which subbands are open for scheduling users and which subbands are not to be used for scheduling users.

In some embodiments, the mask generation process of MCIM is performed as follows. The base station first estimates the power changes. As this is for an on-off type operation, the delta power change will be in the form of positive or negative (e.g., depending on the original state of the subband mask, that is, whether that subband is already being used or not) of the intended subband transmit power. This power change together with the corresponding utility gradient will allow the calculation of the expected utility changes which again, can be positive or negative.

In some embodiments, the base station then updates the subband mask by making all the changes that will result in an increase in (e.g., neighborhood) system utility under any potential system constraints. In some implementations, the following two constraints are considered. If the positive utility change for a subband is associated with an increase in subband power, then the base station can ensure that the total maximum transmit power across the whole system bandwidth is still met. For example, the constraint can be that the sum of all subband powers should be smaller than or equal to a certain threshold percentage (e.g., 80% or some other threshold percentage) of the total transmit power of the base station. If the positive utility change for a subband is associated with a decrease in subband power, then the base station can ensure that it is not sacrificing its own performance too much by trying to improve system utility. In some implementations, this can be achieved by the use of a parameter that guarantees a certain minimum number of subbands that the base station has to leave as "usable" (e.g., or "on" or "active") for the scheduler. For example, such a parameter can be configured (e.g., and slowly changing according to predicted traffic load, for example) or be dynamically tied to the status of Quality of Service (QoS) fulfilment by that base station.

As shown at step 107, once the subband mask is created, the subband mask can be sent to the base station. In particular, the subband mask can be distributed to the MAC layer of the base station to implement as resource usage directives on that base station. For example, the output can be provided as a subband mask for configuring/setting various radio resource constraints, such as on/off settings of the radio resources. As another example, the output can be provided as a resource level mask for setting/configuring various radio resource constraints, such as configuring/setting a graded power level, and/or other radio resource constraints.

In some embodiments, steps 101 to 107 are performed periodically to accommodate for changes in load and channel conditions. For example, the frequency of such mask updates can be in the order of seconds or tenths of seconds or some other frequency.

In some embodiments, instead of an on-off mask approach, a mask that can specify multiple power levels is also used. For example, for a two-power mask, the subband mask directive will indicate the use of a "high power" in some subbands and a "low power" in other subbands. The various techniques described above can be easily adapted by a person of ordinary skill in the art to generate this new kind of subband mask. Further, the MCIM approach can easily accommodate a mask with even finer power granularities. For example, at each instance of the execution of the MCIM algorithm, the base station can be allowed to only select between a step increase or a step decrease of power from the present value for each subband. The step change in power can be, as an example, in the order of 1 to 3 dB.

As discussed above, various techniques for providing the MCIM approach focus on the base station as the entity that performs the algorithm execution. That is, in some embodiments, for example, software modules implementing the MCIM algorithm can be embedded in the base station or deployed to the base station (e.g., MCIM agents). Other than exchanging information as used by the MCIM algorithm(s), the modules at each base station can operate independently within the base station. This architecture implementation can be referred to as a distributed mode of operation (e.g., a distributed architecture implementation). In other implementations, a central server or more generally, a system of servers can be used. In this implementation, the server manages the exchanges of information with the base stations and also executes the MCIM algorithm(s). In some implementations, a client component (e.g., an agent, such as an MCIM agent, can be used to facilitate a distributed architecture implementation and/or a hybrid mode of operation that includes both distributed and centralized implementation aspects that are coordinated) can also be deployed at the base stations to facilitate such an exchange of information between the base stations and the server. A centralized architecture for implementing these MCIM techniques can be called a centralized mode of operation or a hybrid mode of operation if distributed implementation techniques are also used at least in part to implement aspects of these MCIM techniques and coordination, as described herein.

Figure 2:
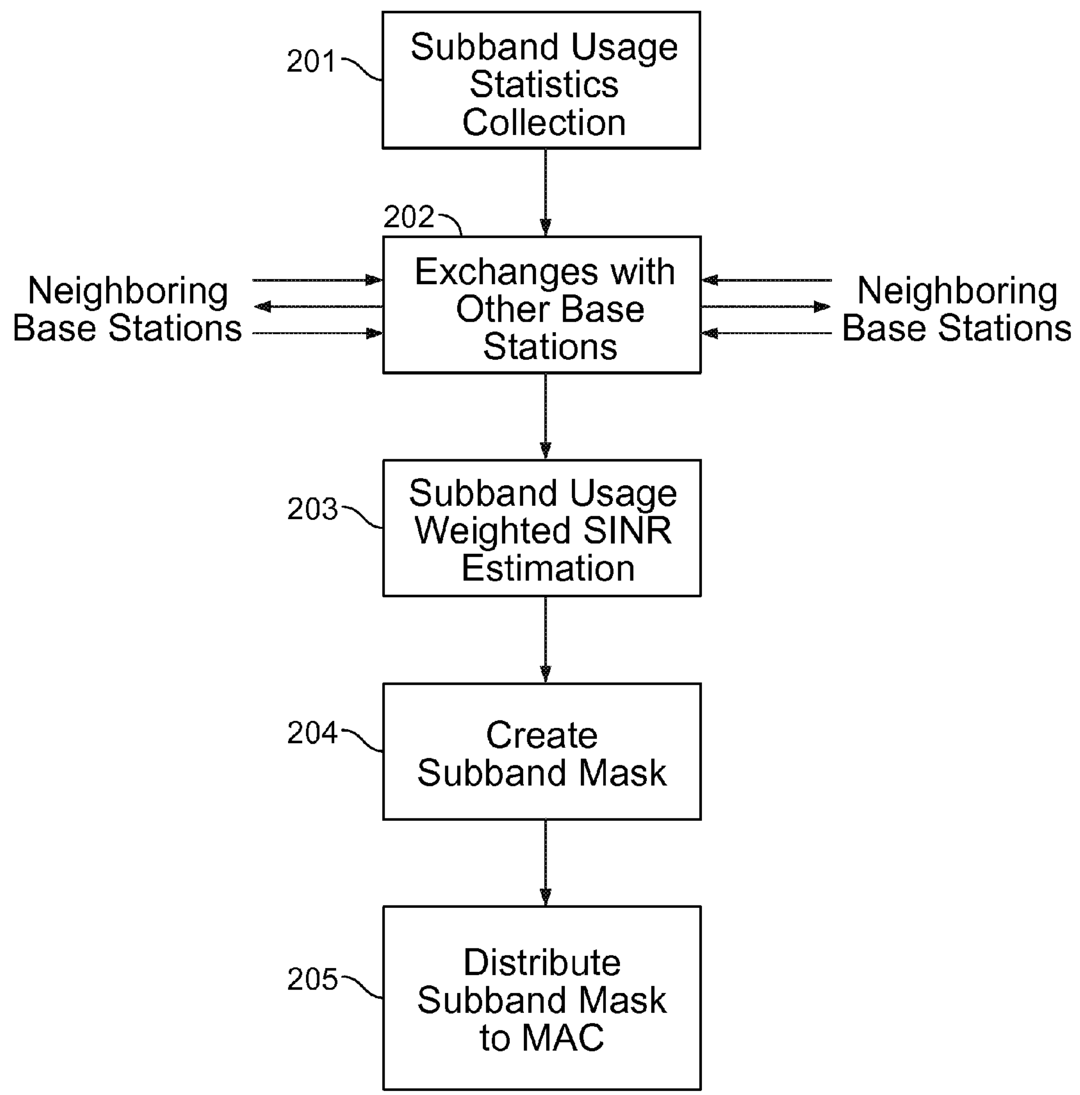
FIG. 2 illustrates a flow diagram for a subband usage-based MCIM process in accordance with some embodiments.

FIG. 2 illustrates a flow diagram for a subband usage-based MCIM process in accordance with some embodiments. In particular, in some wireless communication networks, if subband CQI values cannot be readily obtained (e.g., in some implementations of base stations, such subband CQI values may not be exposed to or accessible (via APIs or other mechanisms) to higher layers in the stack, such as layers 2 and 3 of the protocol stack, and, as a result, may not be accessible for use by the CQI-based MCIM approach described above with respect to FIG. 1), the MCIM approach can still be applied. As such, FIG. 2 illustrates a technique for providing the MCIM approach in a wireless communication network in which subband CQI values cannot be readily obtained (e.g., providing an MCIM approach for scenarios in which subband CQI values are not available or obtained, other data values can be obtained as subband CQI proxy values to, for example, approximate or estimate subband usage information to implement a subband-usage based MCIM approach as discussed below). In some embodiments, this involves the base station collecting statistics on its subband usage (e.g., how often is each of its subbands being scheduled to serve any users over a pre-determined period of time), as shown at 201.

At 202, these subband usage statistics are then exchanged among base stations as similar to the exchange of utility gradients described above.

At 203, after obtaining the subband usage information from its neighbors, a base station can then, combining with the UE reported RSRP values, proceed to calculate an averaged and estimated SINR value for each subband. That is, the subband usage statistics can be used to modify the RSRP value (e.g., which itself is a type of wide-band measurement) to estimate expected subband SINR, as would be apparent to one of ordinary skill in the art in view of the various embodiments disclosed herein. For example, subband SINR can be estimated using the below example function.

$$\text{Subband } SINR = \frac{RSRP_{servingBS}}{\text{Noise Power} + \sum_{all\ neighbor\ BS} SubbandUsageStat_{neighborBS} RSRP_{neighborBS}}$$

At 204, these subband SINR estimates are compared with a pre-configured threshold and all those subbands that have estimated SINR smaller than the threshold can be considered as candidates for marking as "not usable," subjecting to a similar constraint on minimum usable subband as discussed before. The threshold, for example, can be set based on a preferred operational minimum SINR concept. That is, if the estimated SINR is higher than the minimum SINR, then that subband can be marked "usable" as it will be beneficial to system performance. As an example, SINR values in the range of 3~10 dB can be used as a candidate range for such a threshold. This process thus creates a subband mask as similarly discussed above with respect to FIG. 1.

In some embodiments, the subband mask mentioned above is created by considering together the estimated SINR, the power constraint, and the Quality of Service (QoS) requirements.

At 205, once the subband mask is created, the subband mask is sent to the base station. In particular, the subband mask can be distributed to the MAC layer of the base station to implement as resource usage directives on that base station.

In some embodiments, steps 201 to 205 are performed periodically to accommodate for changes in load and channel conditions. For example, the frequency of this mask update can be in the order of seconds or tenths of seconds or some other frequency.

As in the utility gradient case, in view of the various embodiments described herein, this subband usage approach can also be generalized by a person of ordinary skill in the art to support multiple subband power levels with various modifications.

In some wireless communication networks, especially in heterogeneous network deployment environments, there may be multiple types of interference management algorithms being executed by different nodes of the network at the same time. Therefore, the MCIM may not be utilized by all base stations in the network. However, the MCIM can work together with other interference management algorithms as described herein.

Figure 3:
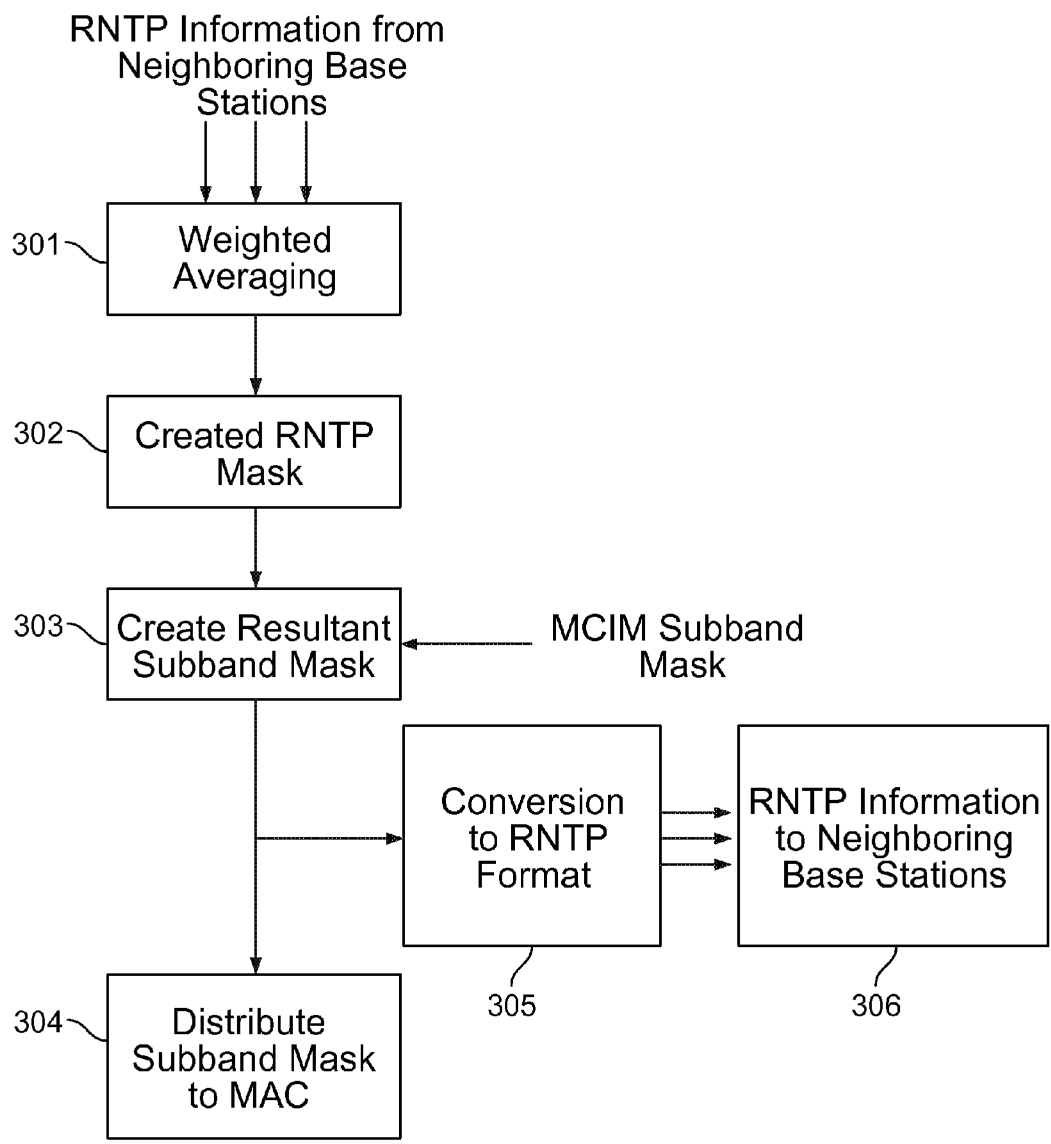
FIG. 3 illustrates a flow diagram for an MCIM process that supports Relative Narrowband Transmit Power (RNTP) operation in accordance with some embodiments.

FIG. 3 illustrates a flow diagram for an MCIM process that supports Relative Narrowband Transmit Power (RNTP) operation in accordance with some embodiments. In some embodiments, MCIM can work together with any interference management algorithms that utilize the Inter-Cell Interference Coordination (ICIC) mechanism supported by the LTE Standard (e.g., the ICIC mechanism can be used as a protocol that can be used as a communication mechanism for Relative Narrowband Transmit Power (RNTP) information exchange among base stations). For example, this ICIC mechanism can provide the framework for the exchanges of Relative Narrowband Transmit Power (RNTP) information among base stations. In particular, MCIM can receive and process the RNTP information sent by other base stations and can transmit its own RNTP information to other base stations as further discussed below.

At 301, after receiving the RNTP information from its neighbors (e.g., which can be used as additional input, in addition to the input received at 101 of FIG. 1 and/or to the input received at 201 of FIG. 2), a base station performs a weighted averaging of that information. The averaging is performed over all the neighbors that sent the RNTP information. For example, the weights can be derived using various techniques according to needs as would be apparent to one of ordinary skill in the art in view of the various embodiments described herein. In some embodiments, for example, the weight design can be based on the transmit power of a neighbor base station as perceived at the base station of concern.

In some embodiments, the basic unit of resource blocks defined in the RNTP information can be grouped into subbands that align with those defined by MCIM. For example, the subband that each basic unit of the RNTP resource block belongs to can be identified. Next, for each subband, the RNTP values of all the basic units of the resource blocks in the RNTP information can be summed up and then normalized by the number of such units in each subband. Then, the normalized sum can either be quantized into "1" and "0" values first, or left unchanged. Finally, the value, now compatible to the MCIM mask, can be used as a subband-based equivalent of RNTP information.

At 302, the weighted average of the RNTP metrics is compared with a pre-determined threshold and thus results in a one-or-zero decision. For example, this decision can be determined per subband, resulting in a subband mask similar to that described above with respect to FIG. 1. This mask can be called the RNTP mask, for distinction from the MCIM mask created by methods described above with respect to FIG. 1.

At 303, once the RNTP mask is obtained, a base station running the MCIM scheme jointly considers the MCIM mask (e.g., the MCIM subband mask, such as using the subband mask generated at 106 of FIG. 1) and the RNTP mask. Techniques for combining these two subband masks would be apparent to one of ordinary skill in the art in view of the various embodiments described herein. For example, the two masks can be combined into a resultant mask using a logical AND operation. As another example, the two masks can be combined into a resultant mask using a logical OR operation. Further, the resulting mask can also be subjected to the constraints described above (e.g., Quality of Service (QoS) and/or other constraints) in other more sophisticated implementations. For example, the final subband mask can be formed based on the MCIM mask first, and then for each subband marked as "usable" by the MCIM mask, the status of the corresponding subband from the RNTP mask can be checked. If it is marked as "not usable" by the RNTP mask, then for the final subband mask, that subband will be changed to "not usable" instead, subjecting, however, to any constraints imposed.

The resultant subband mask, in addition to being used as a MAC scheduler directive as shown at step 304 (e.g., the resultant subband mask can be distributed to the MAC layer of the base station), can be converted, as shown at 305, to RNTP format and then be distributed, as shown at step 306, to neighboring base stations as part of the ICIC mechanism. Thus, this approach generates a resultant resource block-based bitmap that is compliant with the ICIC framework for the exchanges of RNTP information among base stations as defined by the LTE standard.

In some embodiments, steps 301 to 306 are performed periodically to accommodate for changes in load and channel conditions. For example, the frequency of this mask update can be expected to be in the order of seconds or tenths of seconds or some other frequency.

Figure 4:
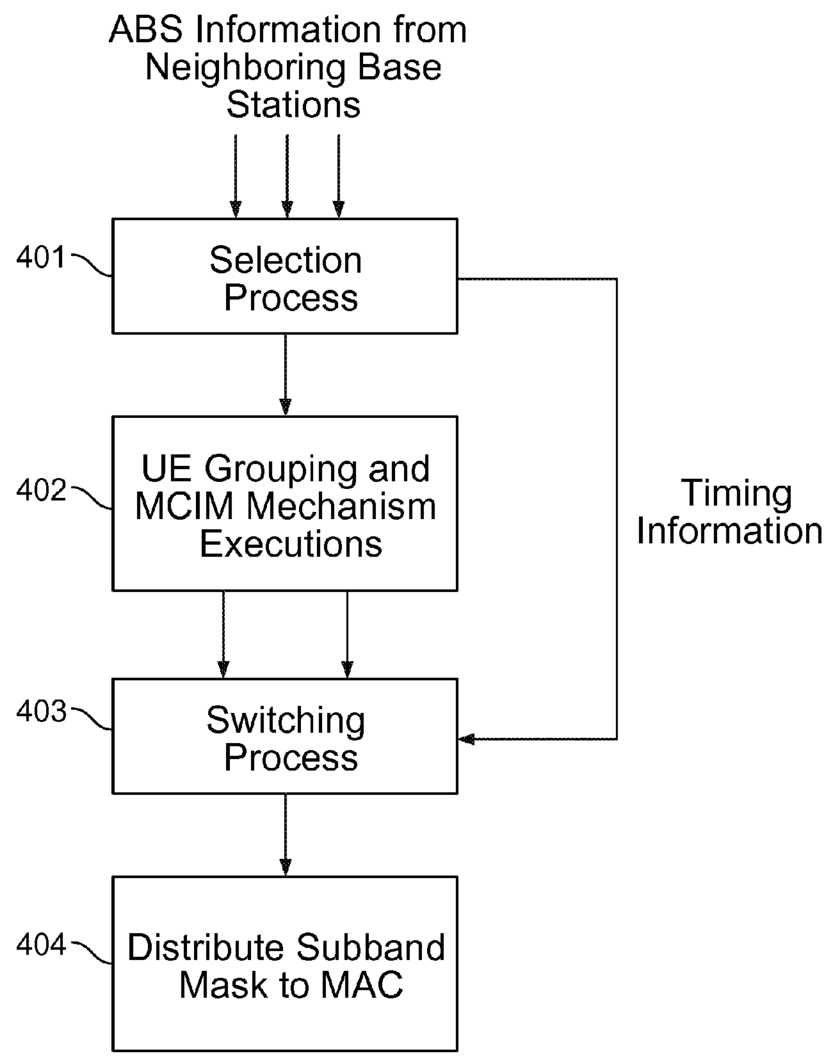
FIG. 4 illustrates a flow diagram for an MCIM process that supports Almost Blank Subframe (ABS) operation in accordance with some embodiments.

FIG. 4 illustrates a flow diagram for an MCIM process that supports Almost Blank Subframe (ABS) operation in accordance with some embodiments. In some embodiments, MCIM can work together with any interference management algorithms that utilize the eICIC (enhanced ICIC) mechanism supported by the LTE Standard. For example, this enhanced ICIC mechanism can provide the framework for the exchanges of Almost Blank Subframe (ABS) information among base stations. Instead of concerned with the frequency domain as in RNTP, ABS is concerned with the time domain. In particular, ABS is a bitmap indicating which subframes (e.g., the ABS subframes) will be absent of data traffic for the base station sending out the ABS information. In particular, MCIM can receive and process the ABS information sent by other base stations as further discussed below.

At 401, a base station receives the ABS information from its neighbor(s). The base station performs a selection process to decide which, of all the received ABS information, should it consider using various criteria. For example, a person of ordinary skill in the art can derive criteria for the selection process according to system requirements in view of the various embodiments described herein. For example, the selection can be just selecting the ABS information from the strongest (e.g., highest RSRP) neighbor. In another example, all ABS information from neighbors with RSRP higher than a certain threshold can be considered together.

At 402, a base station executing the scheme takes into account the selected ABS information. In some embodiments, the base station separates its serving UEs into two groups: one group contains UEs to be served in the ABS subframes, while the other group contains the remaining UEs. The base station executes independent instances of the MCIM mechanism for each of the groups as similarly described above with respect to FIG. 1.

At 403, based on the timing derived from the selected ABS information, the base station selects the appropriate MCIM directive to be sent to the MAC scheduler, as shown at step 404 at which the subband mask can be distributed to the MAC layer of the base station.

In some embodiments, steps 401 to 403 are performed periodically to accommodate for changes in load and channel conditions. For example, the frequency of this mask update can be expected to be in the order of seconds or tenths of seconds or some other frequency.

In some embodiments, a person skilled in the art can combine the methods described above with respect to FIGS. 3 and 4 to accommodate MCIM to work (e.g., function in a supported/interoperable manner) with a wireless network system supporting both RNTP and ABS mechanisms.

Figure 5:
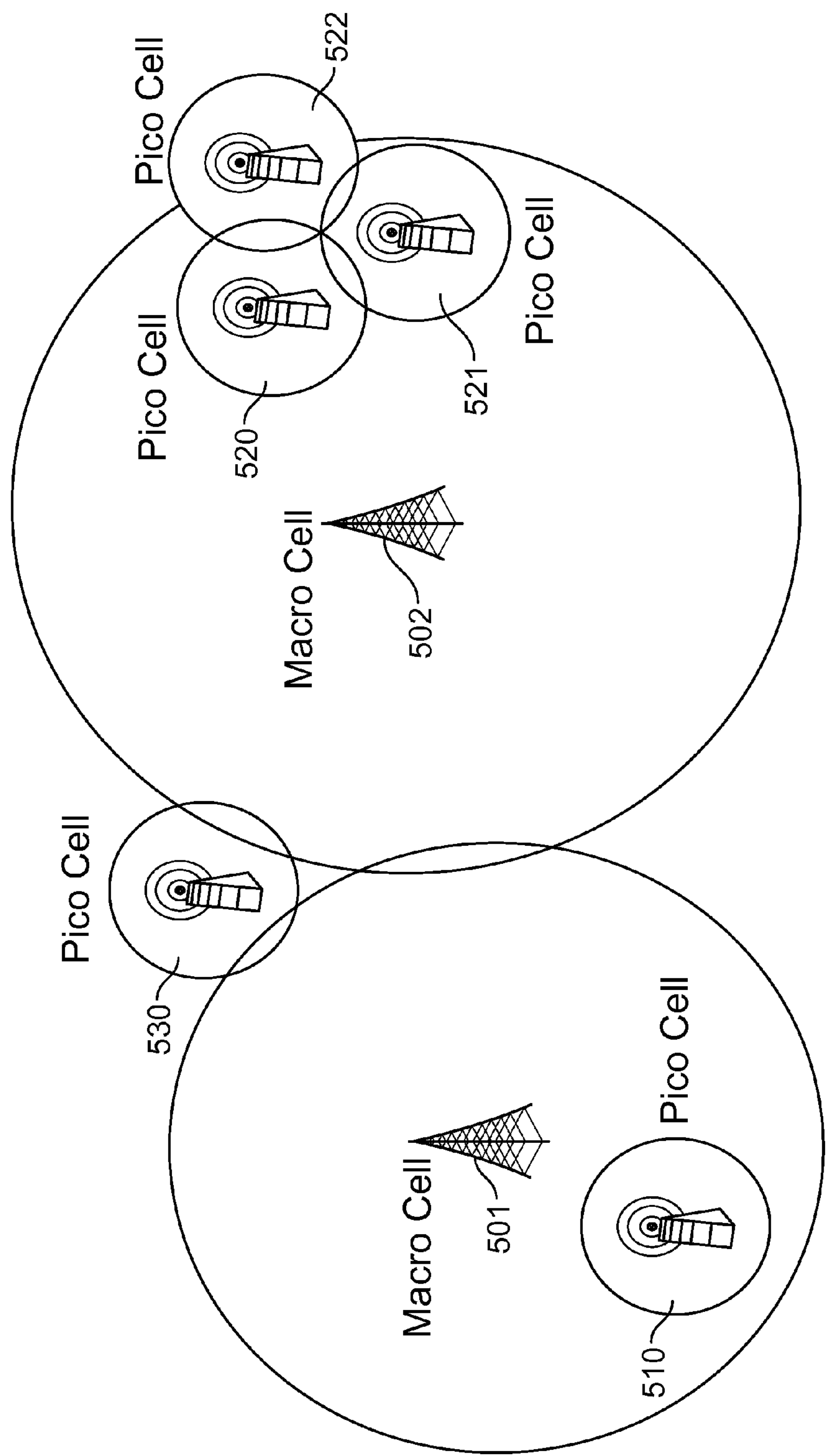
FIG. 5 illustrates an exemplary heterogeneous network that can implement an MCIM approach in accordance with some embodiments.

FIG. 5 illustrates an exemplary heterogeneous network that can implement an MCIM approach in accordance with some embodiments. In particular, FIG. 5 generally illustrates a simplified example of a heterogeneous network (HetNet) with different types of cells. As shown, FIG. 5 illustrates a HetNet including a Pico cell 530 that has a coverage area that overlaps with the coverage areas of a Macro cell 501 and a Macro cell 502 (e.g., each of the Macro cells 501 and 502 also have overlapping coverage areas with each other). As also shown, a Pico cell 510 is within the coverage area of the Macro cell 501, and Pico cells 520, 521, and 522 are within and/or have overlapping coverage areas with Macro cell 502 (e.g., each of the Pico cells 520, 521, and 522 also have overlapping coverage areas with each other). An MCIM approach, such as described herein with respect to various embodiments, can be implemented in the base stations of all the cells or only in some of the cells. In some embodiments, the MCIM approach is implemented only in the base stations of the pico cells, but not the base stations of the macro cells. As will now be apparent to those of ordinary skill in the art, various other cellular network environments (e.g., with different types of combinations of large and/or small cells, in homogeneous and/or heterogeneous networks) can similarly be configured to implement the various MCIM approaches as disclosed herein.

FIG. 6 illustrates a functional diagram of an architecture for implementing an MCIM approach in accordance with some embodiments. As shown, FIG. 6 illustrates a Server 602 and a number of Base Stations (BS1 to BS N, exemplified by 601). In some implementations, Server 602 includes the EMS function/element, and in other implementations, the EMS function/element is implemented on a separate server/computing appliance in the wireless network and is in communication with Server 602. Server 602 is in communication with the Base Stations via telecommunication links. Within the Base Station, there is an MCIM Client 603. The MCIM Client 603 is responsible to communicate with the RRM (Radio Resource Management) function 604 within the Base Station to exchange MCIM relevant information. The MCIM Client 603 is also responsible for processing of any MCIM client-side data and communication with the Server 602. Server 602 includes the module 605 for Server Management Functions and a number of MCIM Server Modules 606. The Server Management Functions 605 manages the communications between the MCIM Client 603 and the MCIM Server Module 606. The MCIM Server Module 606 is responsible for execution of the MCIM algorithms and for communications among MCIM Server Modules 606. In some implementations, the MCIM functions can be performed in part or in whole in each of the base stations (e.g., using an MCIM agent deployed to each of the base stations or MCIM functionality can be embedded in the base stations) to facilitate a distributed architecture implementation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for Multi-Cell Interference Management (MCIM) in a wireless network, comprising:

a processor configured to:

collect data from a neighborhood of base stations in the wireless network;

determine local and neighborhood system utility metrics based on the collected data, wherein the determining of the local and neighborhood system utility metrics comprises:

for a first subband, weigh a first utility gradient of a first base station based on a first weight to generate a first weighted utility gradient; and for the first subband, weigh a second utility gradient of a second base station based on a second weight to generate a second weighted utility gradient, the first weight being different from the second weight;

determine interference managing directives based on the local and neighborhood system utility metrics;

create a subband mask based on the local and neighborhood system utility metrics, wherein the subband mask relates to changes in power of radio resources for a plurality of subbands, one value of the subband mask indicating an increase in transmit power for one subband, another value of the subband mask indicating a decrease in transmit power for another subband, the one subband being different from the other subband, and each subband corresponding to a range of frequencies, and wherein the creating of the subband mask is based on the first and second weighted utility gradients; and distribute the subband mask to a MAC layer of a base station in the neighborhood of base stations, wherein the subband mask is applied to implement radio resource usage directives on the base station; and a memory coupled to the processor and configured to provide the processor with instructions.

2. The system recited in claim 1, wherein the neighborhood of base stations includes at least one macro cell.

3. The system recited in claim 1, wherein the neighborhood of base stations includes at least one macro cell and at least one base station selected from a micro cell, a pico cell, and a femto cell.

4. The system recited in claim 1, wherein the collected data includes Channel Quality Indicator (CQI) measurement data.

5. The system recited in claim 1, wherein the collected data includes subband usage statistical data.

6. The system recited in claim 1, wherein the processor is further configured to:

communicate the interference managing directives to the base station in the neighborhood of base stations.

7. The system recited in claim 1, wherein the processor is further configured to:

communicate the interference managing directives to the MAC layer of the base station in the neighborhood of base stations.

8. The system recited in claim 1, wherein the processor is further configured to:

convert the subband mask to a Relative Narrowband Transmit Power (RNTP) format to create an RNTP resource block-based bitmap.

9. The system recited in claim 1, wherein the processor is further configured to:

receive Almost Blank Subframe (ABS) information at the base station in the neighborhood of base stations, wherein the ABS information is received from one or more other base stations in the neighborhood of base stations; and process the ABS information to select an MCIM directive to be sent to a MAC scheduler of the base station.

10. A method for Multi-Cell Interference Management (MCIM) in a wireless network, comprising:

collecting data from a neighborhood of base stations in the wireless network;

determining local and neighborhood system utility metrics based on the collected data, wherein the determining of the local and neighborhood system utility metrics comprises:

for a first subband, weighing a first utility gradient of a first base station based on a first weight to generate a first weighted utility gradient; and for the first subband, weighing a second utility gradient of a second base station based on a second weight to generate a second weighted utility gradient, the first weight being different from the second weight;

determining interference managing directives based on the local and neighborhood system utility metrics;

creating a subband mask based on the local and neighborhood system utility metrics, wherein the subband mask relates to changes in power of radio resources for a plurality of subbands, one value of the subband mask indicating an increase in transmit power for one subband, another value of the subband mask indicating a decrease in transmit power for another subband, the one subband being different from the other subband, and each subband corresponding to a range of frequencies, and wherein the creating of the subband mask is based on the first and second weighted utility gradients; and distributing the subband mask to a MAC layer of a base station in the neighborhood of base stations, wherein the subband mask is applied to implement radio resource usage directives on the base station.

11. The method of claim 10, wherein the neighborhood of base stations includes at least one macro cell.

12. The method of claim 10, wherein the neighborhood of base stations includes at least one macro cell and at least one base station selected from a micro cell, a pico cell, and a femto cell.

13. The method of claim 10, wherein the collected data includes Channel Quality Indicator (CQI) measurement data.

14. The method of claim 10, wherein the collected data includes subband usage statistical data.

15. A computer program product for Multi-Cell Interference Management (MCIM) in a wireless network, the computer program product being embodied in a tangible non-transitory computer readable storage medium and comprising computer instructions for:

collecting data from a neighborhood of base stations in the wireless network;

determining local and neighborhood system utility metrics based on the collected data, wherein the determining of the local and neighborhood system utility metrics comprises:

for a first subband, weighing a first utility gradient of a first base station based on a first weight to generate a first weighted utility gradient; and for the first subband, weighing a second utility gradient of a second base station based on a second weight to generate a second weighted utility gradient, the first weight being different from the second weight;

determining interference managing directives based on the local and neighborhood system utility metrics;

creating a subband mask based on the local and neighborhood system utility metrics, wherein the subband mask relates to changes in power of radio resources for a plurality of subbands, one value of the subband mask indicating an increase in transmit power for one subband, another value of the subband mask indicating a decrease in transmit power for another subband, the one subband being different from the other subband, and each subband corresponding to a range of frequencies, and wherein the creating of the subband mask is based on the first and second weighted utility gradients; and distributing the subband mask to a MAC layer of a base station in the neighborhood of base stations, wherein the subband mask is applied to implement radio resource usage directives on the base station.

16. The computer program product recited in claim 15, wherein the neighborhood of base stations includes at least one macro cell.

17. The computer program product recited in claim 15, wherein the neighborhood of base stations includes at least one macro cell and at least one base station selected from a micro cell, a pico cell, and a femto cell.

18. The computer program product recited in claim 15, wherein the collected data includes Channel Quality Indicator (CQI) measurement data.

19. The computer program product recited in claim 15, wherein the collected data includes subband usage statistical data.

* * * * *